United States Patent [19]

Balde et al.

[11] 4,192,062

[45] Mar. 11, 1980

[54] TERMINATING FLAT FLEXIBLE CABLES

[75] Inventors: John W. Balde, Flemington, N.J.; Robert A. Spencer, Indianapolis; Richard K. Thompson, Jr., Carmel, both of Ind.

[73] Assignees: Western Electric Company, Inc., New York, N.Y.; Bell Telephone Laboratories, Incorporated, Murray Hill, N.J.

[21] Appl. No.: 913,765

[22] Filed: Jun. 8, 1978

[51] Int. Cl.² .............................................. H01R 43/00
[52] U.S. Cl. ........................................ 29/857; 174/48
[58] Field of Search .................... 29/628, 629; 52/221; 174/48, 50.6, 50.64, 55, 59, 66, 67, 49; 339/39, 92

[56] References Cited

U.S. PATENT DOCUMENTS

| | | | |
|---|---|---|---|
| 3,131,512 | 5/1964 | Macleod, Jr. ................... | 174/48 X |
| 3,597,523 | 8/1971 | Guritz . | |
| 3,764,727 | 10/1973 | Balde . | |
| 3,934,072 | 1/1976 | Balde . | |
| 4,010,314 | 3/1977 | Kohaut ................................ | 174/48 |
| 4,030,801 | 6/1977 | Bunnell . | |

FOREIGN PATENT DOCUMENTS

| | | | |
|---|---|---|---|
| 158959 | 5/1957 | Denmark .................................. | 174/59 |
| 1179621 | 10/1964 | Fed. Rep. of Germany ............ | 174/49 |
| 2347501 | 4/1975 | Fed. Rep. of Germany ............ | 174/48 |
| 418520 | 2/1947 | Italy ......................................... | 174/59 |
| 440219 | 12/1935 | United Kingdom ..................... | 174/59 |
| 1444842 | 8/1976 | United Kingdom ..................... | 174/48 |

Primary Examiner—Francis S. Husar
Assistant Examiner—C. J. Arbes
Attorney, Agent, or Firm—M. Pfeffer; A. S. Rosen

[57] ABSTRACT

A floor plate assembly (11), for terminating flat flexible cables (22,22) at two bracket members (14,14) on the plate, is disclosed. The floor plate has adequate area to assure firm adhesive bonding to a floor (73), with flat flexible cables being laid over the plate. Protective flanges (29,29) are provided on a pair of complementary, temporary cover sections (26,26) and an optionally pivotable bracket member (44) to protect substantial lengths of cable from accidental cutting during carpet-laying operations. The plate and a permanent housing (72) cooperate to clamp the carpet (74) about the bracket members, without creating undue stresses on an adhesive bond between the plate and the floor during threaded attachment of the housing to the bracket.

16 Claims, 9 Drawing Figures

TERMINATING FLAT FLEXIBLE CABLES

BACKGROUND OF THE INVENTION

1. Field of the Invention

This invention relates to terminating flat flexible cables and, more particularly, to apparatus and methods for terminating flat flexible cables along a substantially flat surface, such as a floor, which terminating may take place prior to the laying of carpeting over both the floor and the terminated, flat flexible cables.

2. Description of the Prior Art

Flat flexible cable structures are known. A typical, flat flexible cable includes a number of spaced, substantially parallel-extending conductors which run along the length of a flat, longitudinally extending, dielectric member, and which form, with the dielectric member, an elongated, flexible article. Some examples of flat flexible cable structures are disclosed in U.S. Pat. No. 3,764,727 to J. W. Balde.

It is known also to employ flat flexible cables in various telephone wiring systems within buildings. One or more such cables may be extended along a floor surface to an area at which telephone equipment is to be connected, with a suitable floor covering, typically carpeting, thereafter being laid over the cable in order to hide it from view. Descriptions of such flat flexible cable usage, and of certain associated devices such as connectors, housings, etc., may be found in U.S. Pat. Nos. 3,934,072 and 4,030,801 to J. W. Balde and E. D. Bunnell, respectively.

In the flat flexible cable terminating system disclosed in J. W. Balde U.S. Pat. No. 3,934,072, flat flexible cables are laid along a floor, under a flat peripheral flange at the bottom of a bracket, which bracket is then attached, e.g., by an adhesive material or by fasteners, to the floor. The flat flexible cables extend up through a central opening within the bracket, and into a central connection zone between two spaced, parallel-extending, raised flanges on the bracket. The two raised flanges are adapted to receive opposite ends of up to five female telephone connectors bridging the space between the raised flanges, such female connectors serving to terminate the flat flexible cables. Since the flat flexible cables pass under the peripheral flange and emerge at the central connection zone through the central opening of the bracket, it should be clear that the cables may enter the central connection zone from any direction. The presence of multiple flat flexible cables, passing under the peripheral flange of the bracket from multiple directions, will, however, limit somewhat the area at the bottom of the peripheral flange which may be used in adhesive-attachment of the bracket to the floor. Moreover, such multiple cables may tend to lift the flange, adding stress to an adhesive bond. Thus, where adhesive-attachment is desired but potential flat flexible cable laying arrangements might render passage of the multiple flat flexible cables under a peripheral flange unsuitable for adhesive-attachment, a modified configuration, with the cables extending over a flat-bottomed plate, which is adhesively-attached to the floor, and into a central connection zone, may be more appropriate.

The flat flexible cable terminating system of E. D. Bunnell U.S. Pat. No. 4,030,801 employs a flat-bottomed base plate, which is attached to a floor by fasteners. Two parallel-extending sidewalls stretch upwardly from the base plate and include laterally-projecting ears for receiving opposite ends of two connectors. Each of the connectors is associated with a different one of two flat flexible cables which extend parallel to the sidewalls and toward the laterally-projecting ears from opposite ends of the base plate. The base plate, which is adapted to receive only the two flat flexible cables, is covered, after the termination of the cables and the laying of a carpet over the cables, by a screw-attached housing. The housing has a carpet-engaging, outer periphery which extends outwardly of, and thereby surrounds, an outer periphery of the base plate. Since a screw-attachment operation for securing the housing to the base plate, with the outer periphery of the housing engaging the carpet outwardly of the outer periphery of the base plate, creates upward forces on the base plate which tend to lift the base plate from the floor, the arrangement is evidently not well adapted for adhesive-attachment of the base plate to the floor. Moreover, although the Bunnell patent does disclose the use of a one-piece, flanged, protective fixture to cover the base plate during carpet-laying, the flanges on the fixture are too short, and are not appropriately placed, for adequate protection of substantial lengths of flat flexible cable, extending to the base plate, during carpet cutting operations.

Accordingly, it would clearly be desirable to provide improved facilities for terminating flat flexible cables, which facilities are well adapted for firm adhesive-attachment to a floor prior to terminating of the cables and to laying of carpeting over the cables, which facilities preferably are also well adapted for terminating multiple cables coming from multiple directions, and which facilities include means for reliably protecting substantial lengths of flat flexible cables during carpet cutting operations.

SUMMARY OF THE INVENTION

The invention relates to methods and apparatus which involve terminating a plurality of flat flexible cables at receiving means disposed on a face of a plate. The plurality of flat flexible cables is extended to, and is terminated at, the receiving means. A first cover section, having a first flange, is so placed over at least a first of the flat flexible cables that the first flange stretches across, in close proximity to, and thereby protects, a substantial length of the first cable, while a second cover section, having a second flange, is so placed over at least a second of the flat flexible cables that the second flange stretches across, in close proximity to, and thereby protects, a substantial length of the second cable.

The methods and apparatus of the invention also involve terminating a plurality of flat flexible cables at receiving means disposed on a face of a plate by locating a pivotable member of the receiving means pivoted away from a normal position of the pivotable member, in a cable-laying position of the pivotable member. The plurality of flat flexible cables is extended to the receiving means with at least one of the plurality of cables lying under the normal position of the pivotable member of the receiving means. Thereafter, the pivotable member of the receiving means may be pivoted from its cable-laying position, across such at least one of the plurality of flat flexible cables, and into the normal position of the pivotable member, and the plurality of flat flexible cables may be terminated at the receiving means.

The methods and apparatus of the invention further involve terminating a plurality of flat flexible cables along a substantially flat surface, such as a floor, by adhesively-attaching, to the substantially flat surface, a substantially flat, first face of a plate. The plate also has a second face, with a common outer periphery extending about the first and second faces of the plate. The second face of the plate has means disposed on it for receiving the plurality of flat flexible cables. The plurality of flexible cables may be extended to, and terminated at, the receiving means. There may thereafter be positioned on the second face of the plate, and over the receiving means, a housing which includes a base portion with an outer periphery which is smaller than the outer periphery of the plate. Such positioning causes the outer periphery of the base portion of the housing to extend across each of the plurality of flat flexible cables, with the outer periphery of the plate substantially surrounding the outer periphery of the base portion of the housing. Since the base portion of the housing is juxtaposed to the second surface of the plate along the entire outer periphery of the base portion, threaded-attachment of the housing to the plate may occur without any disadvantageous application of such lifting forces as might loosen the adhesive-attachment the substantially flat, first face of the plate to the substantially flat surface.

DETAILED DESCRIPTION

Figure 1:
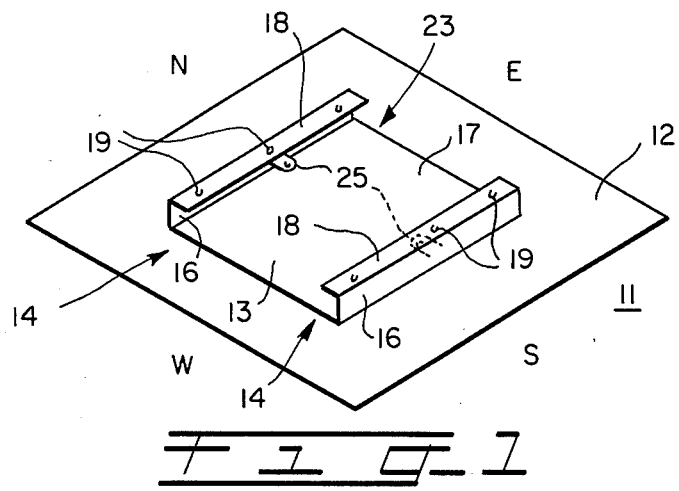
FIG. 1 of the drawing is an isometric illustration of a floor plate and bracket assembly, in accordance with the invention.

Referring initially to FIG. 1 of the drawing, a floor plate and bracket assembly 11 is shown. The assembly 11 includes a floor plate 12 and a bracket 13 which is attached to the floor plate 12, e.g., by welding. Two elongated members 14,14 are included in the bracket 13, the two elongated members 14,14 extending parallel to one another along a direction which is defined arbitrarily, for purposes of discussion, as an East-West direction. (See FIG. 1, wherein the letters, N,E,S and W, represent the respective directions, North, East, South and West, about an outer periphery of the floor plate 12.) The two elongated members 14,14 may, alternatively, be independently mounted to, or integral with, the floor plate 12, rather than both being integral with a common bracket 13.

Each elongated member 14 includes an upstanding, sidewall portion 16 which extends perpendicularly outwardly from a flat, bracket bottom member 17, the bracket bottom member 17 and the floor plate 12 defining two parallel, essentially tangent planes. Each elongated member 14 also includes a connector-receiving flange 18 which extends, along a plane parallel to the planes of the bracket bottom member 17 and the floor plate 12, toward a similar connector-receiving flange 18 on the other elongated member 14. Each connector-receiving flange 18 has a number of apertures 19,19, e.g., three apertures 19,19, extending vertically through it. Each aperture 19 in a connector-receiving flange 18 on one elongated member 14 is aligned with a similar aperture 19 in the connector-receiving flange 18 on the other elongated member 14. The arrangement is such that, as shown in FIG. 2 of the drawing, a number of connectors 21,21, each associated with a different one of a number of flat flexible cables 22,22 extending into a central connection zone 23 between the elongated members 14,14 from the East and/or the West direction, may be placed across the gap between the two elongated members 14,14, and mounted on the elongated members 14,14 by attaching opposite ends of the connectors 21,21, e.g., by bolts 24,24, at the apertures 19,19.

A pair of laterally-projecting ears 25,25 may be located on opposing internal portions of the bracket members 14,14, the ears 25,25 being useful where only a single connector 21 and only a single flat flexible cable 22 are to be employed. The ears 25,25 permit the use of a low-profile housing (not shown) for covering the bracket 13, since the single connector 21 may be mounted extending principally horizontally, parallel to the floor plate 11, on the ears 25,25, rather than in the principally vertical manner shown in FIG. 2.

Figure 2:
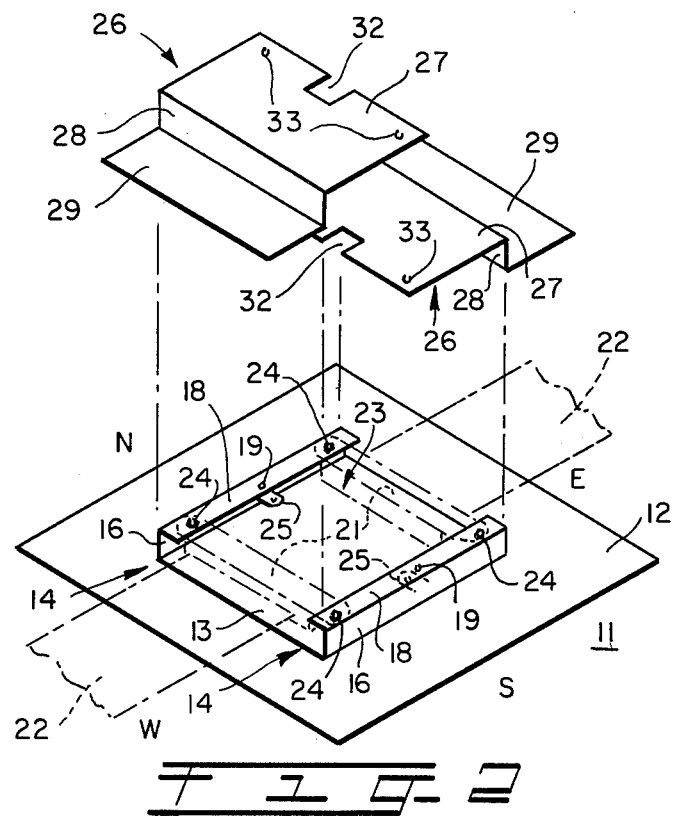
FIG. 2 is an isometric illustration, similar to that of FIG. 1, further showing two flat flexible cables connected to the floor plate and bracket assembly, as well as a pair of sections of a temporary, protective cover which is used with the floor plate and bracket assembly.
Figure 3:
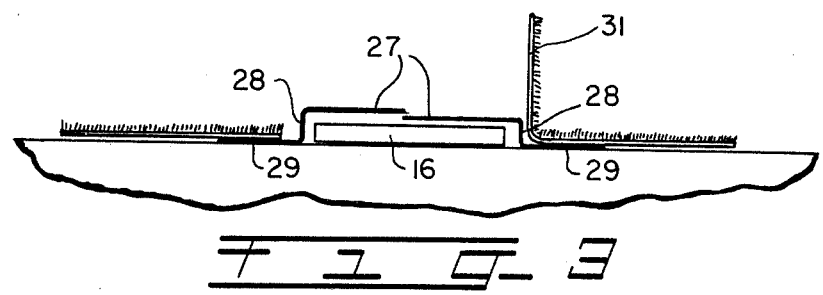
FIGS. 3 and 4 are schematic illustrations showing how the two part, temporary, protective cover of FIG. 2 is employed in laying carpeting over the floor plate and bracket assembly.
Figure 4:
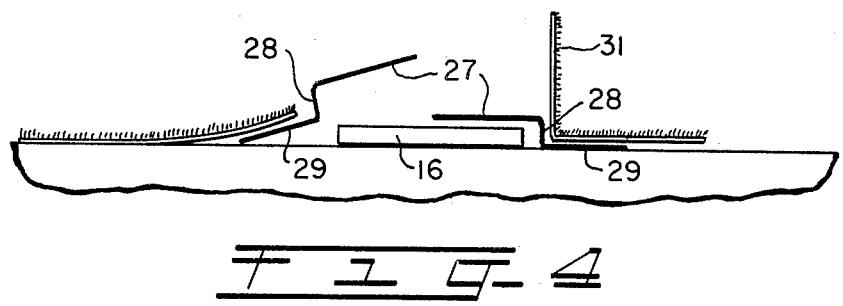

A two part, temporary, protective cover arrangement, which may be used with the floor plate and bracket assembly 11, is shown in FIGS. 2-4 of the drawing. The protective cover is made up of two partially overlapping and/or complementary sections 26,26, which may be of an identical shape but of a reversed orientation. Each cover section 26 includes a flat, top portion 27, a sidewall portion 28 which extends perpendicularly downwardly from the top portion 27, and a cable-protecting flange 29 which is located at the bottom of the sidewall portion 28. The flange 29 extends parallel to the top portion 27 of the cover section 26 for a substantial distance, in a direction opposite to that in which the top portion 27 extends from the sidewall portion 28. The arrangement and the dimensions of the various portions of each cover section 26 are such that the two cover sections 26,26 may be placed over the bracket 13 and across one or more connectors 21,21, e.g., female connectors, mounted on the elongated members 14,14 of the bracket 13 as shown in FIG. 3, with the top portions 27,27 of the cover sections 26,26 located above the top of the bracket 13 and the connectors 21,21, with the sidewall portions 28,28 extending downwardly toward the floor plate 12 outwardly of the connectors 21,21 along the East and West ends of the bracket 13, and with the cable-protecting flanges 29,29 extending over, in close proximity to, a substantial length of one or more flat flexible cables 22,22.

With the two cover sections 26,26 located in the protective positions illustrated in FIG. 3, a carpet installer may sever a carpet 31 or other floor covering laid over the cover sections 26,26, including a cut along an outer edge of the sidewall portion 28 of one or both of the cover sections 26,26, without damaging the flexible cable or cables 22,22 beneath the associated, cable-protecting flange or flanges 29,29. The resulting flap or flaps of the carpet 31 is or are eventually to be hidden within a permanent housing, as will be described more fully below. The permanent housing is to enclose the bracket 13 and the connectors 21,21 after all carpet-laying and telephone installation operations have been completed.

The use of the two cover sections 26,26 permits easy, pivotal removal of the cover assembly after carpet cutting, as shown in FIG. 4. A slot 32 (FIG. 2) is preferably so located on the top portion 27 of each cover section 26 as to facilitate any prying-up of the cover section 26 which may be useful during the cover assembly removal operation. Suitable apertures 33,33 are also preferably present on the top portion 27 of each cover section 26, the apertures 33,33 being so located as to fit over certain ones of the apertures 19,19 on the bracket members 14,14 and any bolts 24,24 in such apertures 19,19, to aid in temporary securement of the cover sections 26,26 to the floor plate and bracket assembly 11 after the mounting of the connectors 21,21 and prior to carpet-laying.

Figure 5:
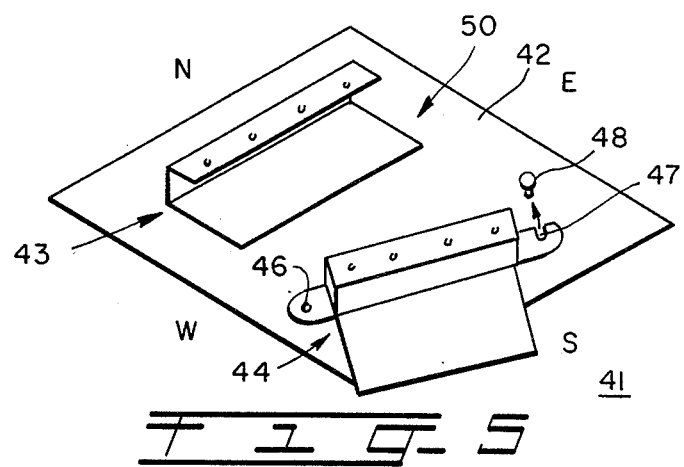
FIG. 5 is an isometric illustration of an alternative floor plate and bracket assembly, in accordance with the invention.
Figure 6:
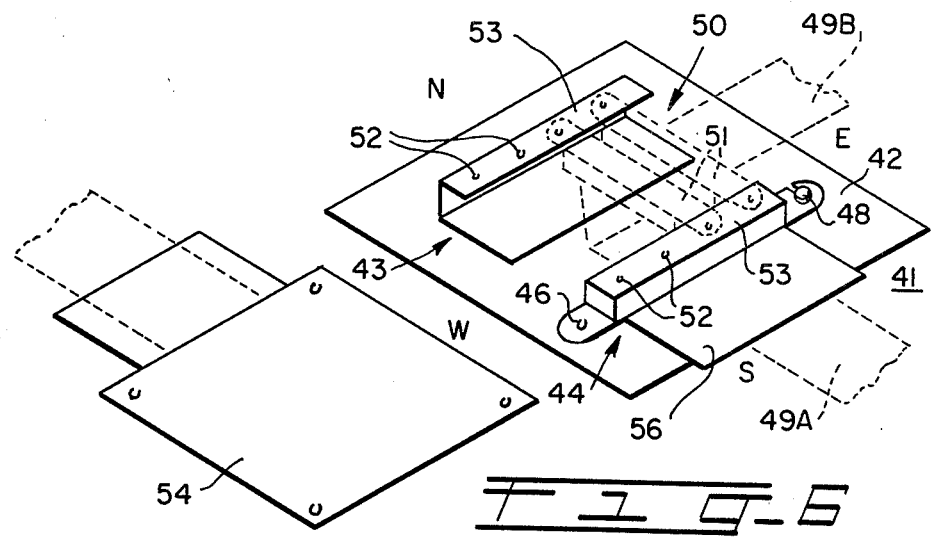
FIG. 6 is an isometric illustration, similar to that of FIG. 5, further showing one possible application of the alternative floor plate and bracket assembly, wherein two flat flexible cables, originating from mutually perpendicular directions, are terminated at the floor plate and bracket assembly.

Turning now to FIGS. 5 and 6 of the drawing, an alternative floor plate and bracket assembly 41 is shown. The floor plate and bracket assembly 41 is adapted to receive flat flexible cables from up to three different directions, i.e., East, West and South, as opposed to the two-directional, East or West capability of the floor plate and bracket assembly 11.

The floor plate and bracket assembly 41 includes a floor plate 42, a first elongated member 43 which is fixedly attached to the floor plate 42, e.g., by welding, and a second elongated member 44 which is mounted to pivot about a pivot pin 46 projecting perpendicularly from the floor plate 42. Pivoting of the second elongated member 44 about the pivot pin 46 will permit displacement of the second elongated member 44 between a cable-laying position (not shown) and a normal position (shown in FIG. 6), in which normal position the second elongated member 44 extends parallel to the first elongated member 43. The second elongated member 44 (shown in FIG. 5 intermediate its cable-laying and normal positions) may be releasably locked in its normal position by the engagement of a slot 47 on the second elongated member 44 with a pin 48 projecting perpendicularly from the floor plate 42, or by means of any other suitable retaining mechanism.

When the second elongated member 44 is located pivoted into its cable-laying position, the South side of the floor plate 42 will be unobstructed. Thus, at least one flat flexible cable 49A (FIG. 6) may be laid across the South edge of the floor plate 42, free of interference from the second elongated member 44, and may be extended into a central connection zone 50 atop the floor plate 42. Alternatively, the floor plate 42 might be so shaped as to permit the flat flexible cable 49A to extend into an open, central connection zone upon traversing an open area between the pivot pin 46 and the pin 48, which open area would be bridged by the second elongated member 44 in its normal position.

After the flat flexible cable 49A is extended into the central connection zone 50, the second elongated member 44 may be pivoted across the cable 49A and into the normal position of the second elongated member 44 shown in FIG. 6. Thereafter, a connector 51 associated with the flat flexible cable 49A, as well as one or more additional connectors 51 associated with one or more additional flat flexible cables 49B coming from the East and/or the West directions, may be mounted at a set of apertures 52,52 along suitable connector-receiving flanges 53,53 on the two elongated members 43 and 44. Such apertures 52,52 correspond to the apertures 19,19 in the connector-receiving flanges 18,18 on the elongated members 14,14 in the floor plate and bracket assembly 11. Thus, the entry of flat flexible cables 49A,49B from three directions, East, West and South, may be accommodated by the floor plate and bracket assembly 41, as may entry from only two, mutually perpendicular directions, e.g., East and South. Such two direction capability may be useful, for example, in the situation shown in FIG. 6, wherein the West direction cannot be used for cable-laying due to the proximity of the floor plate and bracket assembly 41 to a floor plate 54 for access to electrical current.

The second elongated member 44 preferably includes an additional flange 56 which extends outwardly toward the South direction, at the bottom of the second elongated member 44, when the second elongated member 44 is in its normal position. The additional flange 56 cooperates with the previously described, temporary, protective cover arrangement shown in FIGS. 2-4, by serving to protect a substantial length of the South side, flat flexible cable 49A from damage during carpet-laying, due to a close proximity of the flange 56 to the cable 49A.

Figure 7:
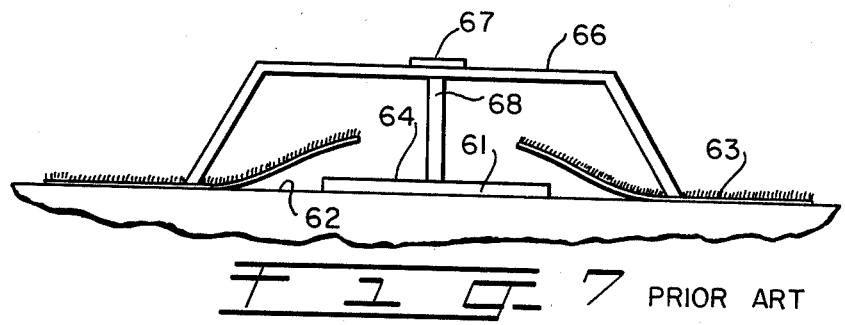
FIG. 7 is a schematic illustration of a prior art, floor plate and housing arrangement used in terminating flat flexible cables.

Referring next to FIG. 7 of the drawing, a prior art arrangment for terminating flat flexible cables used in telephone wiring systems, e.g., an arrangement of the general type disclosed in U.S. Pat. No. 4,030,801 to E. D. Bunnell, includes a floor plate 61. The floor plate 61 is attached, e.g., by fasteners (not shown), to a floor 62, and is adapted to receive one or more flat flexible cables, running along the floor 62, prior to the laying of a carpet 63 onto the floor 62. After the termination of the one or more flat flexible cables in suitable bracket facilities (not shown) mounted on an upper surface 64 of the floor plate 61, and subsequent to the laying of the carpet 63, a housing 66 is attached to the floor plate 61 and bracket assembly, over the terminated cables and over cut, flap portions of the carpet 63, by threaded attachment mechanisms, such as a nut 67 and a bolt 68. The housing 66 is larger than the floor plate 61, such that an outer periphery of the housing 66 engages the carpet 63 outwardly of an outer periphery of the floor plate 61. Thus, as the nut 67 is tightened down onto the bolt 68, an upward, lifting force is applied to the floor plate 61 through the bolt 68. The existence of this lifting force during attachment of the housing 66 renders unattractive any possibility of initially adhesively-attaching, rather than otherwise fastening, the floor plate 61 to the floor 62, since the lifting force may weaken or destroy the adhesive bond between the bottom of the floor plate 61 and the floor 62. Thus, an adhesive-attachment option, which might be economically advantageous, is negated, or at the very least, is compromised, due to the prior art configurations, as depicted in FIG. 7, of the floor plate 61 and housing 66.

Figure 8:
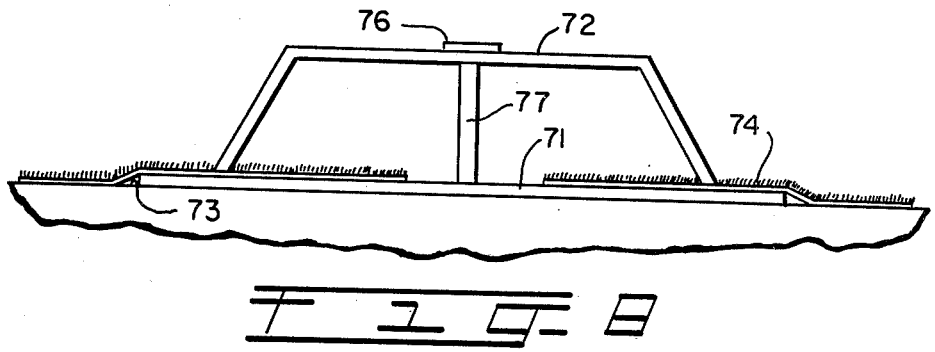
FIG. 8 is a schematic illustration, similar to FIG. 7, showing an improved, floor plate and housing arrangement, in accordance with the invention, which arrangement is preferred for adhesive-attachment of the floor plate to a floor surface.
Figure 9:
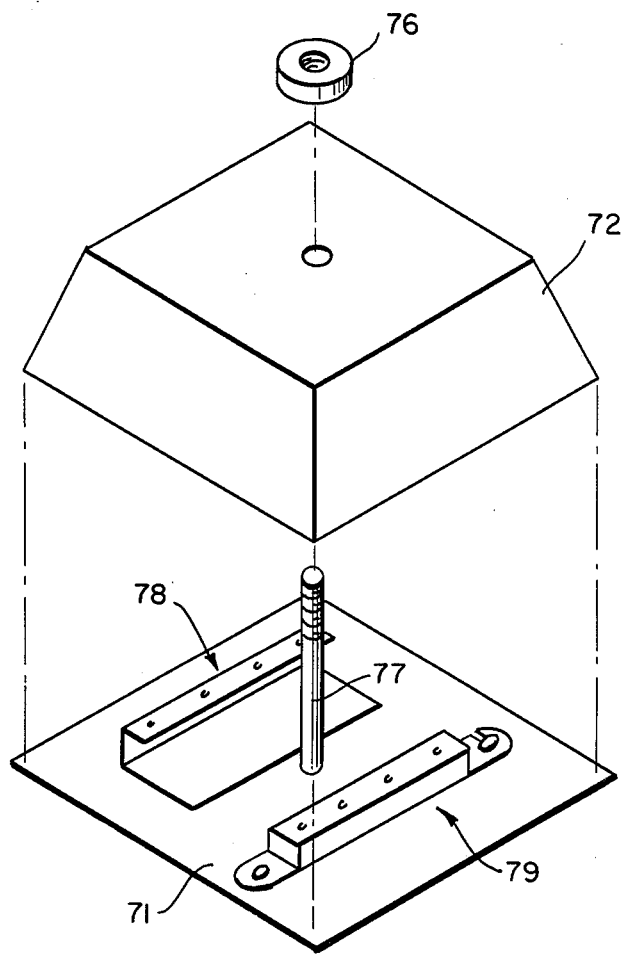
FIG. 9 is an isometric illustration of the embodiment of the invention shown in FIG. 8.

Turning now to FIGS. 8 and 9 of the drawing, an improved floor plate 71 and housing 72 arrangement is illustrated. The floor plate 71 may include elongated members 78 and 79, similar to the elongated members 43 and 44 of FIGS. 5 and 6. The floor plate 71 is relatively large in comparison to the housing 72, such that an outer periphery of the housing 72 is smaller on two or more sides than, so as to be substantially surrounded by, an outer periphery of the floor plate 71. Thus, the floor plate 71 may initially be adhesively-attached to a floor 73, prior to the laying of a carpet 74 on the floor 73. The housing 72 may thereafter be threadedly-attached to the floor plate 71, e.g., with a nut 76 and a bolt 77. The nut 76 may be tightened onto the bolt 77 without any significant lifting force being imposed on the floor plate 71, such as might weaken or destroy the adhesive bond between the bottom of the floor plate 71 and the floor 73. Instead, upward forces on the bolt 77 are counteracted by downward forces applied to the floor plate 71 along the outer periphery of the housing 72. These downward forces also serve to clamp the cut, flap portions of the carpet 74 between the floor plate 71 and the outer periphery of the housing 72. The increased size of the floor plate 71, as compared to the floor plate 61, also provides additional bottom surface area for enhanced adhesive-attachment capability. Alternatively, as shown in J. W. Balde U.S. Pat. No. 3,934,072 and in E. D. Bunnell U.S. Pat. No. 4,030,801, the housing 72 may be secured to a connector-receiving bracket by means of screws or bolts extending downwardly through the top of the housing into threaded sockets or nuts mounted on the connector-receiving bracket.

It is to be understood that the described apparatus and methods are simply illustrative of preferred embodiments of the invention. In another embodiment, two pivotable, elongated, connector-mounting members might be employed, permitting the entry into a central connection zone of flat flexible cables from any one or more of four directions, i.e., North, East, South and/or West. Many additional modifications may, of course, be made in accordance with the principles of the invention.

What is claimed is:

1. Apparatus for terminating a plurality of flat flexible cables along a substantially flat surface, the apparatus comprising:
    a plate having a substantially flat, first face suitable for attachment to said surface, said plate also having a second face;
    means, disposed on said second face of said plate, for receiving a plurality of flat flexible cables extending to said receiving means from three different directions, said receiving means including a pair of spaced, elongated members for each receiving a different portion of each of a plurality of connectors bridging the space between said elongated members, each said connector being associated with a different one of said plurality of flat flexible cables, with one of the elongated members being mounted for pivotal movement away from a normal position thereof parallel to the other of said members so as to permit the receipt of at least one flat flexible cable from one of said three different directions, and with said pivotally-mounted, elongated member including a first flange so disposed, when the pivotally-mounted, elongated member is in said normal position thereof, as to stretch across, in close proximity to, and thereby to protect, a substantial length of said at least one flat flexible cable extending to said receiving means from said first direction;
    a first cover section having a second flange so disposed, when said first cover section is mounted in a protective position thereof, as to stretch across, in close proximity to, and thereby to protect, a substantial length of at least one flat flexible cable extending to said receiving means from a second one of said three different directions;
    a second cover section having a third flange so disposed, when said second cover section is mounted in a protective position thereof, as to stretch across, in close proximity to, and thereby to protect, at least one flat flexible cable extending to said receiving means from a third one of said three different directions; and
    means for mounting said first and second cover sections in said protective positions thereof.

2. Apparatus for terminating a plurality of flat flexible cables along a substantially flat surface, the apparatus comprising:
    a plate having a substantially flat, first face suitable for attachment to said surface, said plate also having a second face;
    a pair of elongated members for each receiving a different portion of each of a plurality of connectors, each of said connectors being associated with a different one of the plurality of flat flexible cables; and
    means, associated with said plate, for mounting both of said elongated members on said second surface of the plate in a normal position of parallel-extending relationship, with one of the elongated members mounted for movement between the normal position thereof and a cable-laying position thereof, such that at least one of the plurality of flat flexible cables may be extended toward the elongated member other than said movably-mounted, elongated member, from a direction transverse to the normally parallel-extending relationship of the two elongated members, with said movably-mounted, elongated member located in said cable-laying position thereof, after which said movably-mounted, elongated member may be moved across said at least one flat flexible cable and into said normal position thereof.

3. Apparatus as set forth in claim 2, further comprising:
    means, mounted on said second face of said plate, for releasably locking said movably-mounted, elongated member in said normal position thereof.

4. Apparatus as set forth in claim 2, further comprising:
    a housing for extending across said plurality of flat flexible cables while enclosing said pair of elongated members, said housing including a base portion with an outer periphery;
    first means, located within an outer periphery of said plate, for receiving a first portion of a threaded, housing-attaching means;
    second means, included in said housing, for receiving a second portion of a threaded, housing-attaching means, said base portion of the housing and said plate having such dimensions that, when said first and second receiving means are in alignment and the base portion of the housing is juxtaposed to said second face of the plate, said outer periphery of the base portion of the housing will be substantially surrounded by said outer periphery of the plate; and a threaded, housing-attaching means, having a first portion configured to be received by said first receiving means and a second portion configured to be received by said second receiving means, for attaching said housing to said plate with said first and second receiving means in alignment and said base portion of the housing juxtaposed to said second face of the plate.

5. Apparatus as set forth in claim 2, wherein:
each of said pair of elongated members includes at least a portion thereof extending outwardly from a plane defined by said second face of said plate, so as to receive said connector portions spaced from said plane of the second face of the plate; and said movably-mounted, elongated member further includes a flange extending from said outwardly extending portion toward said transverse direction from which said at least one of said plurality of flat flexible cables may be extended, said flange being so disposed that, when the movably-mounted, elongated member is in said normal position thereof, said flange may stretch across, in close proximity to, and thereby protect, a substantial length of said at least one flat flexible cable.

6. Apparatus as set forth in claim 5, further comprising:
temporary cover means, extending across said pair of elongated members and including a first pair of flanges extending outwardly at opposite outward ends of the pair of elongated members, for stretching across, in close proximity to, and thereby protecting a substantial length of at least one flat flexible cable extending to at least one connector received by the pair of elongated members and past at least one of said opposite outward ends of the pair of elongated members, said cover means further including a second pair of flanges extending inwardly at opposite inward ends of the pair of elongated members for stretching across, in close proximity to, and thereby protecting, said at least one connector.

7. Apparatus as set forth in claim 6, said temporary cover means comprising:
two discrete cover sections, each including a different one of said first pair of flanges and a different one of said second pair of flanges.

8. Apparatus for terminating a plurality of flat flexible cables along a substantially flat surface, the apparatus comprising:
a plate having a substantially flat, first face suitable for attachment to said surface, said plate also having a second face;
means, disposed on said second face of said plate for receiving first and second flat flexible cables extending to the receiving means from opposite directions; and
a pair of cover sections, each having a sidewall, a first flange extending in a first direction from one edge of the sidewall, and a second flange extending in an opposite direction from an opposite edge of the sidewall, the pair of sections being adapted to be positioned over the plate such that the first flanges thereof extend away from one another with the first flange of one of the sections overlying and thereby protecting a length of the first flat flexible cable and with the first flange of the other section overlying and thereby protecting a length of the second flat flexible cable, the second flanges of the sections extending toward one another and cooperating to overlie and thereby protect the receiving means.

9. Apparatus as set forth in claims 2, 3, 4, 5, 6 or 7 in which said movably-mounted member is pivotably mounted for pivotal movement between the normal and cable-laying positions thereof.

10. A method of terminating a plurality of flat flexible cables having respective connectors attached thereto at receiving means disposed on a face of a plate, the receiving means including first and second spaced connector mounting members, at least one of said members being movable, the method comprising the steps of:
(a) moving the movable member away from a normal position of the movable member wherein said movable member is parallel to the other of said members, to a cable-laying position of the movable member;
(b) extending the plurality of flat flexible cables to the receiving means with at least one of the plurality of flat flexible cables lying under said normal position of the movable member of the receiving means;
(c) moving the movable member of the receiving means from said cable-laying position of the movable member, across said at least one of the plurality of flat flexible cables, and into said normal position of the movable member; and
(d) terminating the plurality of flat flexible cables at the receiving means by attaching the connectors to the first and second members.

11. A method as set forth in claim 10, further comprising the additional steps of:
(e) adhesively-attaching a substantially flat, additional face of the plate, substantially opposite to said face of the plate on which said receiving means are disposed, to a substantially flat surface;
(f) positioning on the face of the plate on which the receiving means are disposed, and over the receiving means, a housing which includes a base portion with an outer periphery which is smaller than an outer periphery of the plate, such positioning extending the outer periphery of the base portion of the housing across each of the plurality of flat flexible cables with the outer periphery of the plate substantially surrounding the outer periphery of the base portion of the housing; and
(g) threadedly-attaching the housing to the plate.

12. A method of terminating a plurality of flat flexible cables at receiving means disposed on a face of a plate, the method comprising the steps of:
(a) extending the plurality of flat flexible cables to the receiving means;
(b) terminating the plurality of flat flexible cables at the receiving means;
(c) so placing a first cover section, having a first flange, over at least a first of the flat flexible cables that the first flange stretches across, in close proximity to, and thereby protects, a substantial length of said first cable;
(d) so placing a second cover section, having a second flange, over at least a second of the flat flexible cables that the second flange stretches across, in close proximity to, and thereby protects, a substantial length of said second cable;
(e) placing a flexible material over the first and second cover sections;
(f) sitting the material over the first and second cover sections, the first and second flanges preventing slitting of the lengths of cable over which they are placed; and
(g) then pivoting the first cover section about its first flange and the second cover about its second flange to remove said cover sections from their positions over their respective cables.

13. A method as set forth in claim 12, further comprising the additional steps of:
(h) pivoting a pivotable member of said receiving means away from a normal position in which said pivotable member is parallel to a stationary member of the receiving means to a cable-laying position of the pivotable member, prior to the performance of step (a); and
(i) pivoting the pivotable member of the receiving means from said cable-laying position of the pivotable member, across at least one of the plurality of flat flexible cables, and into said normal position of the pivotable member, subsequent to the performance of step (a) and prior to the performance of step (b).

14. A method as set forth in claim 12, further comprising the additional steps of:
(j) prior to step (a), adhesively-attaching a substantially flat, additional face of the plate, substantially opposite to said face of the plate on which said receiving means are disposed, to a substantially flat surface;
(k) subsequent to step (g), positioning on the face of the plate on which the receiving means are disposed, and over the receiving means, a housing which includes a base portion with an outer periphery which is smaller than an outer periphery of the plate, such positioning extending the outer periphery of the base portion of the housing over portions of the flexible material and across each of the plurality of flat flexible cables with the outer periphery of the plate substantially surrounding the outer periphery of the base portion of the housing; and
(l) threadedly-attaching the housing to the plate.

15. A method as set forth in claim 14, wherein the flat surface is a floor and the flexible material includes carpeting, and further comprising the step of clamping portions of the carpeting between the housing and the plate.

16. A method as set forth in claims 10 or 11, wherein step (a) comprises pivoting the member between the normal and cable-laying positions thereof.

* * * * *

UNITED STATES PATENT OFFICE
CERTIFICATE OF CORRECTION

PATENT NO. : 4,192,062

DATED : March 11, 1980

INVENTOR(S) : J. W. Balde, R. A. Spencer, R. K. Thompson, Jr.

It is certified that error appears in the above-identified patent and that said Letters Patent are hereby corrected as shown below:

In the claims, Column 11, claim 12, line 5, "sitting" should read --slitting--. Column 12, claim 16, line 26, "the member" should read --the movable member--.

Signed and Sealed this

Fifteenth Day of July 1980

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 4,192,062
DATED : March 11, 1980
INVENTOR(S) : J. W. Balde-R. A. Spencer-R. K. Thompson, Jr.

It is certified that error appears in the above-identified patent and that said Letters Patent are hereby corrected as shown below:

On the title page, the section entitled "FOREIGN PATENT DOCUMENTS", that portion which reads "158959   5/1957   Denmark..........174/59"

should read

--158959   5/1957   Sweden..........174/59--.

Signed and Sealed this

Twenty-first Day of October 1980

[SEAL]

Attest:

SIDNEY A. DIAMOND

Attesting Officer

Commissioner of Patents and Trademarks